United States Patent

[11] 3,627,228

[72] Inventor Earnest Carrington Wolfe Tokyo, Japan
[21] Appl. No. 756,911
[22] Filed Sept. 3, 1968
[45] Patented Dec. 14, 1971
[73] Assignee Tamura Electric Works Limited Tokyo, Japan
[32] Priority Nov. 29, 1967
[33] Japan
[31] 42/76178

[54] TAPE POSITION MARKING AND SENSING DEVICE
3 Claims, 4 Drawing Figs.

[52] U.S. Cl. .......... 242/201, 235/132 R, 242/57, 242/191, 242/208
[51] Int. Cl. .......... G11b 15/18
[50] Field of Search .......... 242/57, 208; 235/132 R, 132 E

[56] References Cited
UNITED STATES PATENTS

| | | | |
|---|---|---|---|
| 3,032,285 | 5/1962 | Brede .......... | 242/208 |
| 3,167,264 | 1/1965 | Ohtsu .......... | 242/208 |

*Primary Examiner*—George F. Mautz
*Attorney*—Chittick, Pfund, Birch, Samuels & Gauthier

ABSTRACT: A tape position sensing and control device operates in conjunction with a multidigit tape position counter which is adapted to reset through the null position, i.e., between 0000 and 9999 and derive a control signal such as a switch closure from the nine position on the most significant digit dial of the counter. By pressing the reset button a particular position of the tape is identified and thereafter in conjunction with other controls such as rewind or repeat the return of the tape to the marked position generates a control signal which can be used to control the tape drive.

INVENTOR
EARNEST C. WOLFE

BY Chittick, Pfund, Birch, Samuels & Gauthier
ATTORNEYS

TAPE POSITION MARKING AND SENSING DEVICE

This invention relates to a tape recorder tape position sensing device used to actuate the popular Automatic Reverse devices and related devices, and more particularly to a sensing device consisting of a revolution counteractuated electrical contact.

The Automatic Reverse, Automatic Stop, Automatic Repeat devices, etc., for tape recorders have proved popular, but their operation depends on some type of sensing device which signals the approaching end of the tape. As the end of the tape approaches, the sensing device directly or indirectly passes electrical current to a solenoid which is linked with the tape recorder mechanism in such a way that when the solenoid is energized, the tape transport mechanism stops or reverses.

Prior sensing devices (several types are used in present day tape recorders) display one or more of the following disadvantages, depending on the type:

1. Expensive.
2. Require some special preparation of the tape, such as attaching a piece of metal foil to the tape or prerecording a tone on the tape at the desired "Stop" point.
3. Require special electronic circuits to record and later to sense a tone "Stop" signal on the tape.
4. Lacking precision; do not stop or reverse tape at exactly the desired point.
5. Lacking flexibility; the desired "Stop" point on the tape is difficult or impossible to change.

The object of the present invention is to provide tape recorders with a tape position sensing device which is at the same time cheap, precise, flexible, simple to manufacture and simple to use.

This and other objects are accomplished by the parts, improvements, combinations and arrangements comprising the invention, a preferred embodiment of which is shown by way of example in the accompanying drawings, and herein described in detail. Various modifications and changes in details of construction are comprehended within the scope of the appended claims.

The invention may be defined in general terms as comprising a revolution counterlinked with one of the tape reels of a tape recorder in such a way as to indicate a number proportional to the number or reel revolutions, an electrical contact being linked with the revolution counter in such a way that the contact closes when the counter indicates a certain number, thus sensing that a certain point on the tape has been reached.

Figure 1:
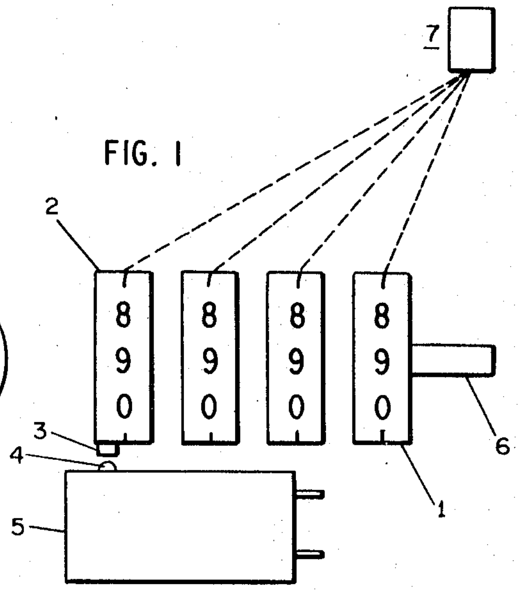

Reference is made to the following drawings:

FIG. 1 is a top view of a conventional mechanical revolution counter. (Parts unnecessary to this explanation have been omitted, but in the normal operation of such counters an input shaft 6 drives the last-digit counter drum 1. As the input shaft rotates, the counter drums are caused to revolve by an intermittent gear arrangement, giving a digital display of the number of revolutions of the shaft. A reset push button 7, when depressed, resets the counter drums to predetermined number, usually 0000.) In this invention, a high-cam surface 3 is added to the first-digit counter drum 2. This cam closes an attached microswitch 5 when the first-digit counter drum reads "9". The counter is arranged to reset to 9999 when the reset button is pressed.

Figure 3:
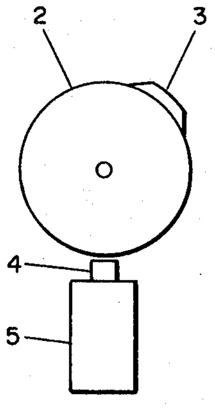
Figure 2:
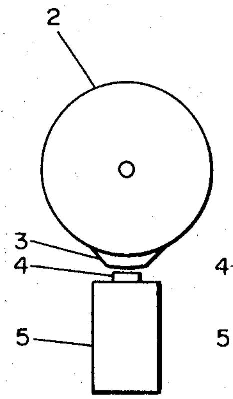
Figure 4:
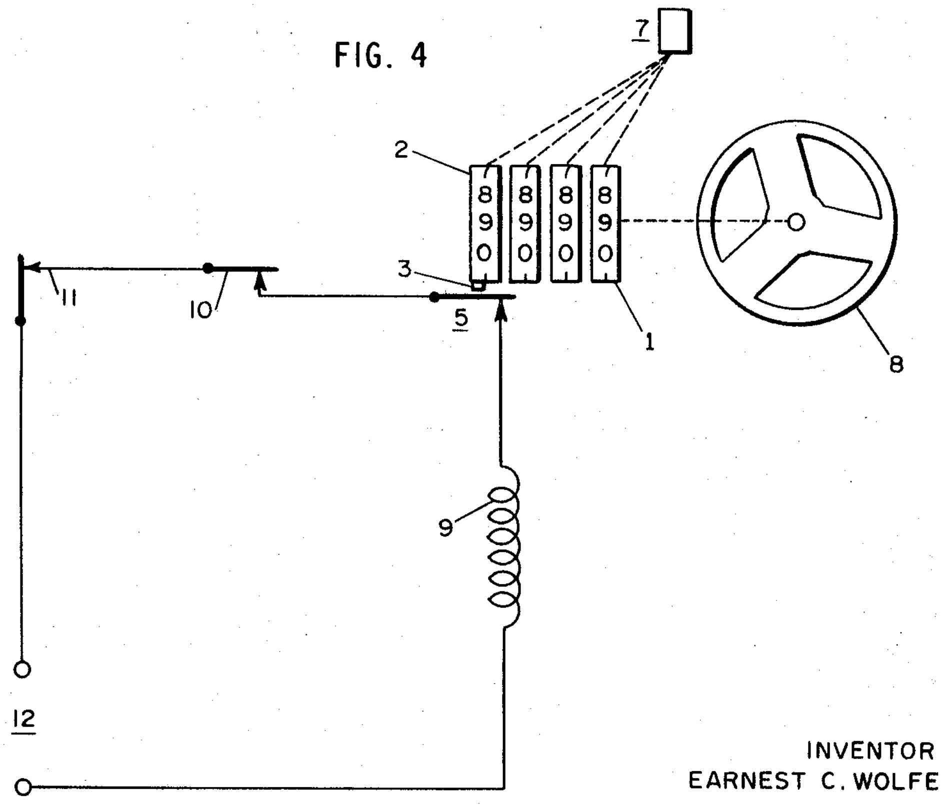

FIG. 2 and 3 are left side views of only the first-digit counter drum 2, high-cam surface 3, and the microswitch 5 with its operating stud 4; FIG. 2 shows the drum standing at "9" when the cam is pressing microswitch operating stud 4, closing the microswitch contacts. FIG. 3 shows the drum at some number other than "9," where the microswitch contacts are open. FIG. 4 shows the sensing device of FIG. 1 connected into a suitable conventional circuit to provide Automatic Rewind Stop. Solenoid 9 is linked with the tape recorder mechanism in such a way that when the solenoid is energized, tape movement stops. Contact 10 is linked with the tape recorder mechanism in such a way that when the tape recorder is "Rewinding" the contact is closed; the contact is open at all other times, thus preventing flow of solenoid current except during Rewinding. Switch 11 is an ON-OFF switch for the Automatic Rewind Stop device. Electric power for the circuit is provided by source 12. Solenoid 9 and switch 10 and 11 are common to all present-day Automatic Rewind Stop devices. In addition, a sensing device is necessary to energize the solenoid at a given predetermined point on the tape as the end of the tape approaches. In this invention, the sensing device consists of the revolution countercontrolled contact 5.

Continuing with FIG. 4 the revolution counter is linked with tape reel 8 in such a way that when the tape is moving "forward" (Record, Play or Fast Forward) the counter turns to higher numbers, and when the tape is moving in reverse (Reverse or Rewind) the counter moves to lower numbers. Reset pushbutton 7 (in old style counters a rotary knob reset is used) resets the counter to 9999. Thus, the reset pushbutton, when pressed, "Marks" the desired "stop" point.

Suppose, for example, the operator of the tape recorder wants to make a recording for immediate replay. Naturally he wants the Play operation to begin at the same point on the tape where the recording began. So, in preparing to make the recording, when he puts the tape on the recorder, after winding a suitable leader-length of tape onto the takeup reel, he checks to be sure the Automatic Rewind Stop switch 11 is turned ON, then presses the revolution counter reset pushbutton 7, which resets the counter 9999. (Resetting the counter to 9999 "Marks" this place on the tape, and later, when rewinding, the tape will stop rewinding at this point.) The operator now proceeds with the recording: as the recording progresses, the counter turns, from 9999 to 0000, 0001, 0002, 0003...0126. Suppose the recording is completed at this point, and the operator stops the recorder. Now he starts the recorder to rewinding. The tape moves in reverse, the counter turns 0126...0003, 0003, 0002, 0001, 0000, 9999. As the counter moves from 0000 to 9999, the electrical contact on the first digit counter drum closes, energizing the solenoid, the recorder stops, at the original point, ready for replay precisely from the beginning of the recording. (As soon as the recorder stops, contact 10 opens, stopping further flow of current through the solenoid.)

"Tape counters" consisting of a mechanical revolution counter have been standard equipment on many tape recorders in the past, and this convenient device has grown in popularity since the recent development of the pushbutton (so-called ONE-TOUCH) reset type of counter. With this invention, the mere addition of an electrical contact to such a counter converts it into a fine sensing device. However, in order to take full advantage of the precision possible with this device, the tape counter should be directly linked with the tape reel, without the conventional reducing gear, so that the last-digit counter drum indicates approximately tenths of reel revolutions, rather than the conventional indication of approximately reel revolutions. Then, assuming good general design in the rest of the tape recorder concerned (good brakes and not too much inertia in the control mechanism) it becomes possible to automatically stop the rewinding within one-tenth reel revolution of the desired place.

In the explanation above, and throughout this petition, a four-digit counter is used as an example. A counter of any number of digits sufficient to count reel revolutions of all the tape on the recorder can be used as well.

If several electrical contacts are used, that is, one contact for each counter drum, the resulting sensing device could be used to stop the tape at any desired counter number. But by using 9999 as the "Reset" number or "MARK" only one electrical contact, actuated by the most significant digit counter-drum alone, is sufficient. This is because only between 0000 and 9999 do all the counterdrums move simultaneously from identical digits to identical digits. Thus, the counter-plus electrical-contact combination is simplified by using 9999 as the "MARK".

In the explanation above, the counter was linked with the tape reel in such a way that as the desired "STOP" point was approached, the counter was counting down: 0003, 0002, 0001, 0000, 9999. However, if the tape-reel-to-counter linkage is reversed to produce a complement count, so that the counter is counting up; 9997, 9998, 9999, 0000 as the desired "STOP" point is approached, then in FIG. 4, the cam must be arranged to close the contact when the most significant digit counterdrum indicates "Zero" rather that "Nine" and the "Reset" or "MARK" pushbutton resets the counter to 0000. The counter is thus characterized as passing through the null between 0000 and 9999 for either direction of counting.

I claim:

1. A tape recorder tape position sensing and control device comprising:

tape drive means for running record tape in forward and reverse direction;

a multidigit up-down counter operable in one direction to accumulate a digital count and in reverse direction to remove the count including operation through null to a complement beginning position;

means for coupling said tape drive means to said counter to relate the count on said counter to the position of said tape on said tape drive means;

manually operable means for resetting said counter to a reset condition to pass all of said digits through null to said complement beginning position;

means responsive to said reset condition of only the most significant digit of said counter for producing a control signal; and means selectively conditionable to be responsive to said control signal for operatively controlling said tape drive means.

2. Apparatus according to claim 1 in which said counter accumulates a positive count for forward direction motion of said tape and includes a switch actuator means operable for the nine position of said most significant digit for producing said control signal; and said reset condition sets the nines for all of said digits.

3. Apparatus according to claim 1 in which said counter accumulates a complement count for forward direction motion of said tape and includes a switch actuator means operable for the zero position of said most significant digit for producing said control signal; and said reset condition sets the zeros for all of said digits.

* * * * *

PO-1050
(5/69)

UNITED STATES PATENT OFFICE
CERTIFICATE OF CORRECTION

Patent No. 3,627,228 Dated December 14, 1971

Inventor(s) Earnest Carrington Wolfe

It is certified that error appears in the above-identified patent and that said Letters Patent are hereby corrected as shown below:

Column 2, line 33, change "...0003, 0003, 0002, 0001, 0000,9999." to -- ...0003, 0002, 0001, 0000, 9999. --.

Signed and sealed this 17th day of October 1972.

(SEAL)
Attest:

EDWARD M.FLETCHER,JR.
Attesting Officer

ROBERT GOTTSCHALK
Commissioner of Patents